US006943894B2

(12) United States Patent
Kitahara

(10) Patent No.: US 6,943,894 B2
(45) Date of Patent: Sep. 13, 2005

(54) LASER DISTANCE MEASURING SYSTEM AND LASER DISTANCE MEASURING METHOD

(75) Inventor: Hiroaki Kitahara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 267 days.

(21) Appl. No.: 10/395,846

(22) Filed: Mar. 25, 2003

(65) Prior Publication Data

US 2004/0036887 A1 Feb. 26, 2004

(30) Foreign Application Priority Data

Mar. 27, 2002 (JP) ........................................ 2002-087907

(51) Int. Cl.[7] .................................................. G01B 9/02
(52) U.S. Cl. ....................................... 356/487; 356/486
(58) Field of Search ................................ 356/486, 487, 356/493, 498

(56) References Cited

U.S. PATENT DOCUMENTS 3,597,091 A * 8/1971 Bowker ...................... 356/498
5,305,088 A * 4/1994 Hosoe ........................ 356/487
5,585,922 A * 12/1996 Sueyoshi .................... 356/487
5,675,412 A * 10/1997 Solomon .................... 356/498
5,818,588 A * 10/1998 Matsumoto et al. ........ 356/487

* cited by examiner

*Primary Examiner*—Gregory J. Toatley, Jr.
*Assistant Examiner*—Patrick Connolly
(74) *Attorney, Agent, or Firm*—McGinn & Gibb, PLLC

(57) ABSTRACT

A laser distance measuring system has a simple optical structure with which abnormal return light can be removed. The laser distance measuring system includes a laser light source that generates at least two interferable light beams with different frequencies on a same optical axis, a parallel reflecting portion that includes a reflecting surface, which is included in an object that moves along a measurement axis and that is arranged on the measurement axis, and returns an incident light beam in a direction opposite that at which it is incident and at a certain spacing from and parallel to the incident light beam, and an interferometer that is positioned between the laser light source and the parallel reflecting portion and that is arranged on the measurement axis. The optical axes of the light beams are displaced parallel to one another from the measurement axis and one of the light beams is passed through the interferometer and guided to the parallel reflecting portion. The interferometer has a flat reflector that maintains a light path of the light beam that is returned by the parallel reflecting portion.

17 Claims, 9 Drawing Sheets

LASER DISTANCE MEASURING SYSTEM AND LASER DISTANCE MEASURING METHOD

BACKGROUND OF THE INVENTION

1. Field of the Invention

The present invention relates to laser distance measuring systems and laser distance measuring methods for measuring the length of an object to be measured.

2. Description of the Related Art

Interferometers split light from a laser light source into at least two light beams that can be interfered, which are then sent over different light paths and subsequently recombined and interfered, and have found application in technologies for distance measurement.

Methods for distance measurement that utilize the interference of light waves include coincidence methods, in which the interference fringes at both ends of an object to be measured are observed to measure the distance, and counting methods, in which an interferometer is configured using a movable measurement reflecting mirror that is moved from the starting point to the end point of a distance to be measured to count the light and dark interference fringes that occur over this distance. A laser distance measuring system that uses a laser light source is one example of a counting method, and such systems are widely used for precise distance measurement.

FIG. 1 is a diagram that schematically illustrates the configuration of the most basic two-wavelength type movable interferometer (linear interferometer), which is a type of laser distance measuring system. A HeNe laser serving as a laser light source 1 emits a light beam having frequency components f1 and f2, which have slightly different frequencies due to the Zeeman effect created by a magnetic field that is applied to a discharge portion. The light beam with the components f1 and f2 is outputted from the light source and inputted into an interferometer. The two light beam components are circularly polarized light beams that have planes of polarization that are perpendicular to one another and that rotate in opposite directions. The two frequency components f1 and f2 of the light beam are both stabilized. The components of the light beam are subjected to photoelectrical conversion by a photodetector inside the laser light source 1, and a beat signal f1−f2 is output to a measurement electronics 11 as an electrical reference signal.

The light beam having the components f1 and f2 that is emitted from the laser light source 1 is split into its two frequency components by a polarizing beam splitter 3, which is a part of an interferometer IM.

The light beam f1 is projected to a reflecting surface 6 to be measured, such as a corner cube that has been attached to a moving object, is reflected by this surface, and is taken as measurement light. On the other hand, the light beam f2 is reflected by a reference mirror 8 such as a stationary corner cube, and is taken as reference light. The measurement light and the reference light are once again combined by the polarizing beam splitter 3 and are interfered with one another. When the polarizing beam splitter 3 and the measured reflecting surface 6 are moved relative to one another, the Doppler effect causes the frequency of the measurement light f1 to be changed by the amount $\Delta f$, that is, a Doppler component is added, and f1 becomes f1$\pm\Delta f$.

The light beams that are combined by the polarizing beam splitter 3 and interfered with one another are converted into electricity by the photodetector 10, and the measurement signal f1−f2$\pm\Delta f$ of the deviated beat signal is obtained as the difference in the light frequencies by heterodyne detection. A measurement electronics 11 determines the value of $\pm\Delta f$, which is the difference between the measurement signal f1−f2$\pm\Delta f$ and the reference signal f1−f2 of the laser light source, and converts this value into position information. That is, the numerical difference between the displacement measurement signal and the reference signal is determined by a frequency counter of the measurement electronics 11 and this difference is multiplied by ½ the wavelength of the light beam. The resulting value is the distance that the measured reflecting surface 6 has moved with respect to the beam splitter.

Also, a single-beam interferometer may be used if due to space constraints the reflecting surface that is measured is small or if the reflecting surface is cylindrical or spherical.

One approach for achieving high-resolution with a laser distance measuring system that uses a single-beam interferometer is to adopt a single-beam two-path interferometer that passes the distance measurement light over the light path between the polarizing beam splitter 3 and the measured reflecting surface 6 twice so as to increase the Doppler effect and thereby raise resolution.

FIG. 2 shows the configuration of a single-beam two-path interferometer that passes light twice over interference light paths of an optical system to achieve high-resolution. In FIGS. 1 and 2, the laser light source 1 generates two light beams f1 and f2, which have planes of polarization that are perpendicular to one another and have slightly different frequencies, and are propagated and returned over the same optical axis from the light source, although for the sake of description they are shown as parallel but separate in the drawings. The single beam two-path interferometer is provided with the polarizing beam splitter 3, corner cubes (cube corer reflectors) 8 and 9 that oppose one another sandwiching the polarizing beam splitter 3 and the optical axis in between, a quarter wavelength plate 4 that is arranged on the optical axis on the output side of the polarizing beam splitter, and a quarter wavelength plate 7 that is arranged between the polarizing beam splitter 3 and the corner cube 8.

As shown in FIG. 2, the two light beams f1 and f2 that are generated by and output from the laser light source 1 pass through a non-polarizing beam splitter 2 and are incident on the polarizing beam splitter 3, where they are separated from one another.

The f1 light that is transmitted through the polarizing beam splitter 3 is reflected by the measured reflecting surface 6, which is attached to an object to be measured. If there is relative movement between the polarizing beam splitter 3 and the measured reflecting surface 6, then a Doppler component is added and f1 becomes f1$\pm\Delta f$. The light beam then returns to the polarizing beam splitter 3. Because the light beam f1$\pm\Delta f$ passes through the quarter wavelength plate 4 twice, rotating its polarization plane by 90°, it is now reflected by the polarizing beam splitter 3 and proceeds in the direction of the corner cube 9. The f1$\pm\Delta f$ light beam that is returned by the corner cube 9 is reflected by the polarizing beam splitter 3, once again passed through the quarter wavelength plate 4, reflected by the measured reflecting surface 6, becoming f1$\pm 2\Delta f$, and then once again passes through the quarter wavelength plate 4 and returns to the polarizing beam splitter 3.

On the other hand, the f2 light beam serves as the reference light, and follows a light path that traverses the polarizing beam splitter 3, the quarter wavelength plate 7, the corner cube 8, the quarter wavelength plate 7, the polarizing beam splitter 3, the corner cube 9, the polarizing beam splitter 3, the quarter wavelength plate 7, the corner cube 8, the quarter wavelength plate 7, and finally the polarizing beam splitter 3. Here, the corner cube 8 is a reference reflecting mirror that has been fixed to the polarizing beam splitter 3. The measuring light beam and the reference light beam that return to the polarizing beam splitter 3 are once again combined, proceed toward the non-polarizing beam splitter 2 and half of them are reflected and are incident on the photodetector 10. The incident light beam, is converted into an electrical signal by the photodetector 10 through heterodyne detection and becomes the measurement signal f1−f2±2Δf. The value of ±2Δf, which is the difference between the measurement signal f1−f2±2Δf and the reference signal f1−f2 of the laser light source, is determined by the measurement electronics 11, which converts it into position information.

Thus, with a single-beam two-path interferometer, the measurement light travels twice back and forth between the interferometer and the measured reflector so that the Doppler component becomes ±2Δf, and therefore its resolution is double that of an ordinary single-beam interferometer.

As shown for example in FIG. 3, when using a laser distance measuring system that employs a single-beam two-path interferometer, the configuration of the system may necessitate the arrangement of a component that corrupts the polarized light, such as a beam bender 12, on the interference light path (between the polarizing beam splitter 3 and the measured reflecting surface 6), or the reflecting surface itself may corrupt the polarized light. In such cases, the problem arises that the reflected light is incompletely isolated by the polarizing beam splitter 3 and the quarter wavelength plate 4, and in addition to the normal return light (reflected light passed twice), abnormal return light (reflected light passed once or reflected light passed three times) also arrives at the photodetector 10. That is, after traveling from the laser light source 1 through the non-polarizing beam splitter 2, the polarizing beam splitter 3, the quarter wavelength plate 4, the beam bender 12, the measured reflecting surface 6, the beam bender 12, the quarter wavelength plate 4, and the polarizing beam splitter 3, in that order, a portion of the light that should be reflected toward the corner cube 9 instead is transmitted toward the non-polarizing beam splitter 2, becoming an abnormal return light f1±Δf, and arrives at the photodetector 10. Similarly, a portion of the twice-passed reflected light f1±2Δf that should be transmitted to the non-polarizing beam splitter 2 after traversing a normal route, that is, the route from the laser light source 1 through the non-polarizing beam splitter 2, the polarizing beam splitter 3, the quarter wavelength plate 4, the beam bender 12, the measured reflecting surface 6, the beam bender 12, the quarter wavelength plate 4, the polarizing beam splitter 3, the corner cube 9, the polarizing beam splitter 3, the quarter wavelength plate 4, the beam bender 12, the measured reflecting surface 6, the beam bender 12, the quarter wavelength 4, and the polarizing beam splitter 3, in that order, may instead be reflected toward the corner cube 9 and once again travel through the corner cube 9, the polarizing beam splitter 3, the quarter wavelength plate 4, the beam bender 12, the measured reflecting surface 6, the beam bender 12, the quarter wavelength plate 4, the polarizing beam splitter 3, and the non-polarizing beam splitter 2, in that order, becoming a three time-passed reflected light beam f1±3Δf, and arriving at the photodetector 10. When these abnormal return light beams f1±Δf and f1±3Δf are incident on the photodetector 10, not only do measurement errors occur but the abnormal light beams cause interference with the normal return light beam f1±2Δf, and this may make measurement itself impossible.

SUMMARY OF THE INVENTION

Therefore, with the foregoing in mind, it is an object of the present invention to provide a laser distance measuring system and a laser distance measurement method with a simple optical configuration that allows abnormal return light to be removed.

A laser distance measuring system of the invention includes:

a laser light source that generates at least two interferable light beams with different frequencies on the same optical axis;

a parallel reflecting portion that includes a reflecting surface, which is included in an object that moves along a measurement axis and which is arranged on the measurement axis, the parallel reflecting portion returning an incident light beam in a direction opposite that at which it is incident, at a certain spacing from and parallel to the incident light beam; and an interferometer that is positioned between the laser light source and the parallel reflecting portion and that is arranged on the measurement axis;

wherein the optical axes of the light beams are displaced in a parallel manner from measurement axis and a portion of the light beams is passed through the interferometer and guided to the parallel reflecting portion, and wherein the interferometer comprises a flat reflector that maintains a light path of a portion of the light beams that is returned by the parallel reflecting portion.

In the laser distance measuring system of the invention, the interferometer includes a polarizing beam splitter that is arranged on the measurement axis, a pair of first and second reflecting means that oppose one another with the polarizing beam splitter and the measurement axis sandwiched in between, a quarter wavelength plate that is arranged on an emission side of the polarizing beam splitter, and a quarter wavelength plate that is arranged between the polarizing beam splitter and the first reflecting means, and the second reflecting means is a plane mirror reflector and the first reflecting means is a fastened corner cube or a second plane mirror reflector.

In the laser distance measuring system of the invention, the parallel reflecting portion includes a converging lens, which is arranged between the interferometer and the reflecting surface that is included in the object, which has an optical axis that coincides with the measurement axis, and which has a focal point on the measurement axis.

In the laser distance measuring system of the invention, the interferometer includes a polarizing beam splitter that is arranged on the measurement axis, a pair of first and second reflecting means that oppose one another with the polarizing beam splitter and the measurement axis sandwiched in between;

a quarter wavelength plate that is arranged on an emission side of the polarizing beam splitter; and a quarter wavelength plate that is arranged between the polarizing beam splitter and the first reflecting means;

wherein the second reflecting means is the flat reflector; and wherein the first reflecting means includes:

a second parallel reflecting portion, which is provided on the measurement axis on a side of the object that is opposite to that of the parallel reflecting portion, which includes a second reflecting surface whose back faces the parallel reflecting portion, and which returns an incident light beam in a direction that is opposite to that at which it is incident and at a certain spacing from and parallel to the incident light beam; and an opposing incidence optical system that lets a portion of the light beams be incident on the second parallel reflecting portion in an opposing manner on the measurement axis.

In the laser distance measuring system of the invention, the second parallel reflecting portion includes a second converging lens, which is arranged in the opposing incidence optical system, which has an optical axis that coincides the measurement axis, and which has a focal point on the measurement axis.

In the laser distance measuring system of the invention, the reflecting surface that is included in the object is a corner cube whose apex coincides with the measurement axis.

In the laser distance measuring system of the invention, the object is a disk having a principal face that is perpendicular to the measurement axis.

A laser distance measuring method of the invention for measuring an amount of movement of an object, which changes a length of one of the light paths, based on optical frequencies obtained by photoelectrically converting light beams that have traveled over different optical paths and been combined again, with a laser distance measuring system including a laser light source that generates at least two interferable light beams with different frequencies on the same optical axis, a parallel reflecting portion that includes a reflecting surface, which is included in an object that moves along a measurement axis and which is arranged on the measurement axis, the parallel reflecting portion returning an incident light beam in a direction opposite that at which it is incident, and at a certain spacing from and parallel to the incident light beam, and an interferometer that is positioned between the laser light source and the parallel reflecting portion and that is arranged on the measurement axis and has a flat reflector, the laser distance measuring method including:

a step of supporting the laser light source so that the optical axes of the light beams are displaced parallel to one another from the measurement axis and one of the light beams is passed through the interferometer and guided to the parallel reflecting portion; and a step of maintaining the optical path of the light beam that is returned by the parallel reflecting portion using the flat reflector.

The laser distance measuring method of the invention further includes a step of providing a second reflecting surface on the measurement axis and on the side of the object that is opposite the parallel reflecting portion so that its back is to the parallel reflector portion and making the other light beam on the measurement axis incident on the second reflecting surface so that it opposes the reflecting surface, and a step of returning to the interferometer the light that is reflected by the second reflecting surface in a direction opposite that at which it is incident and at a certain spacing from and parallel to the incident light.

In the laser distance measuring method of the invention, the parallel reflecting portion includes a converging lens, which is arranged between the interferometer and the reflecting surface that is included in the object, which has an optical axis that coincides with the measurement axis, and which has a focal point on the measurement axis.

DESCRIPTION OF THE PREFERRED EMBODIMENTS

Hereinafter, a laser distance measuring system according to an embodiment of the invention is described with reference to the drawings.

Figure 1:
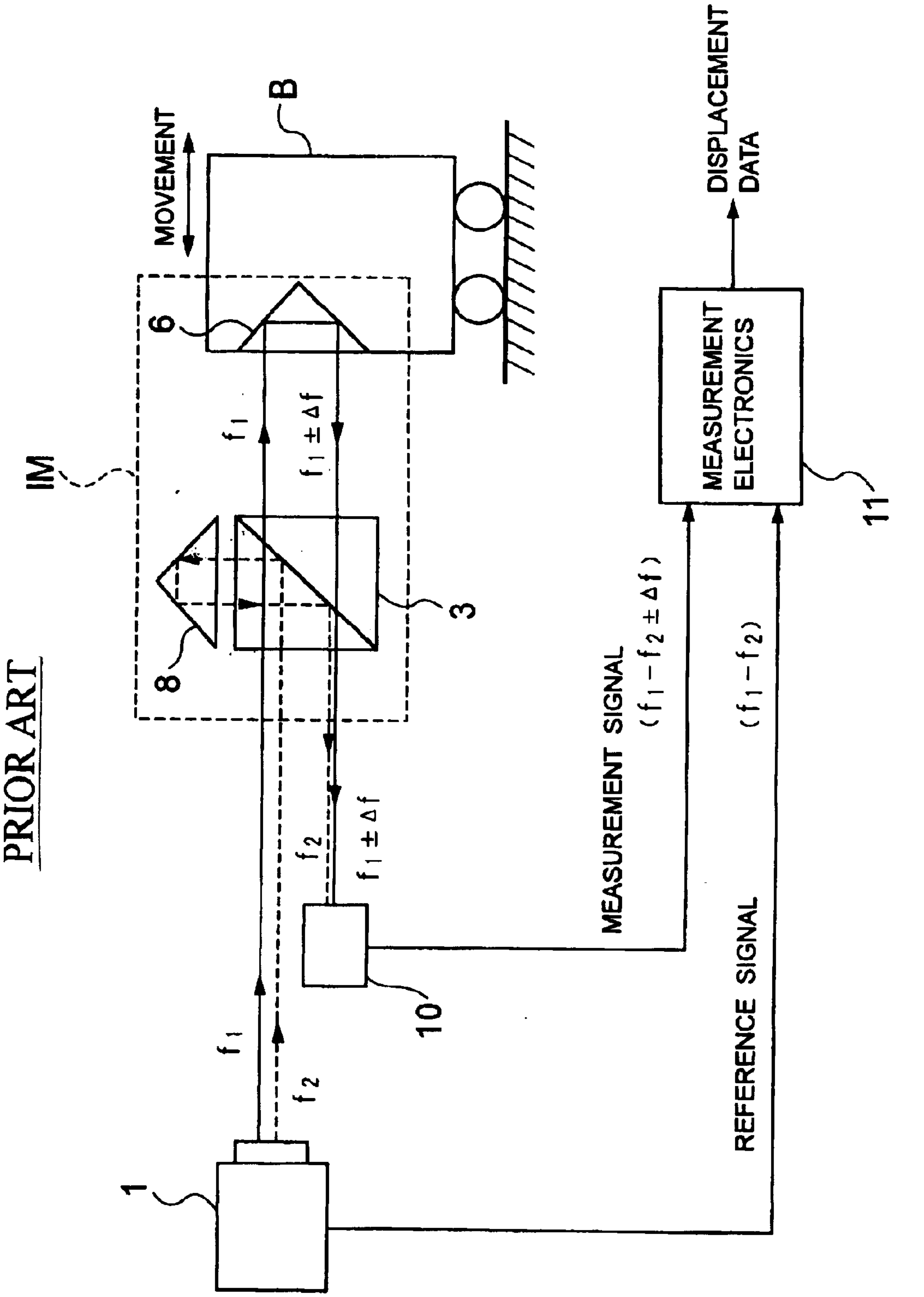
FIG. 1 is a diagram illustrating a conventional laser distance measuring system.
Figure 2:
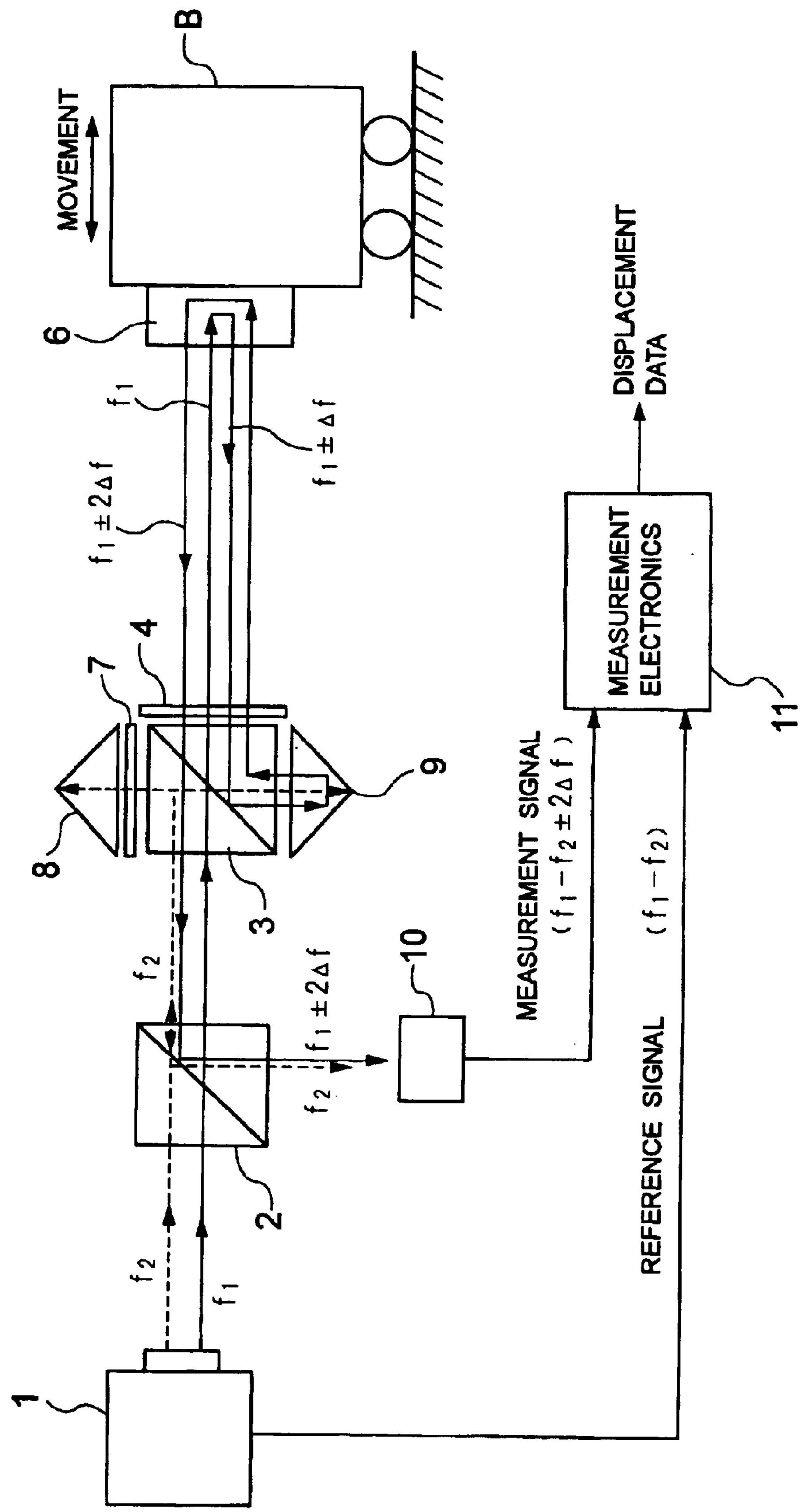
FIG. 2 is a diagram illustrating a conventional laser distance measuring system.
Figure 3:
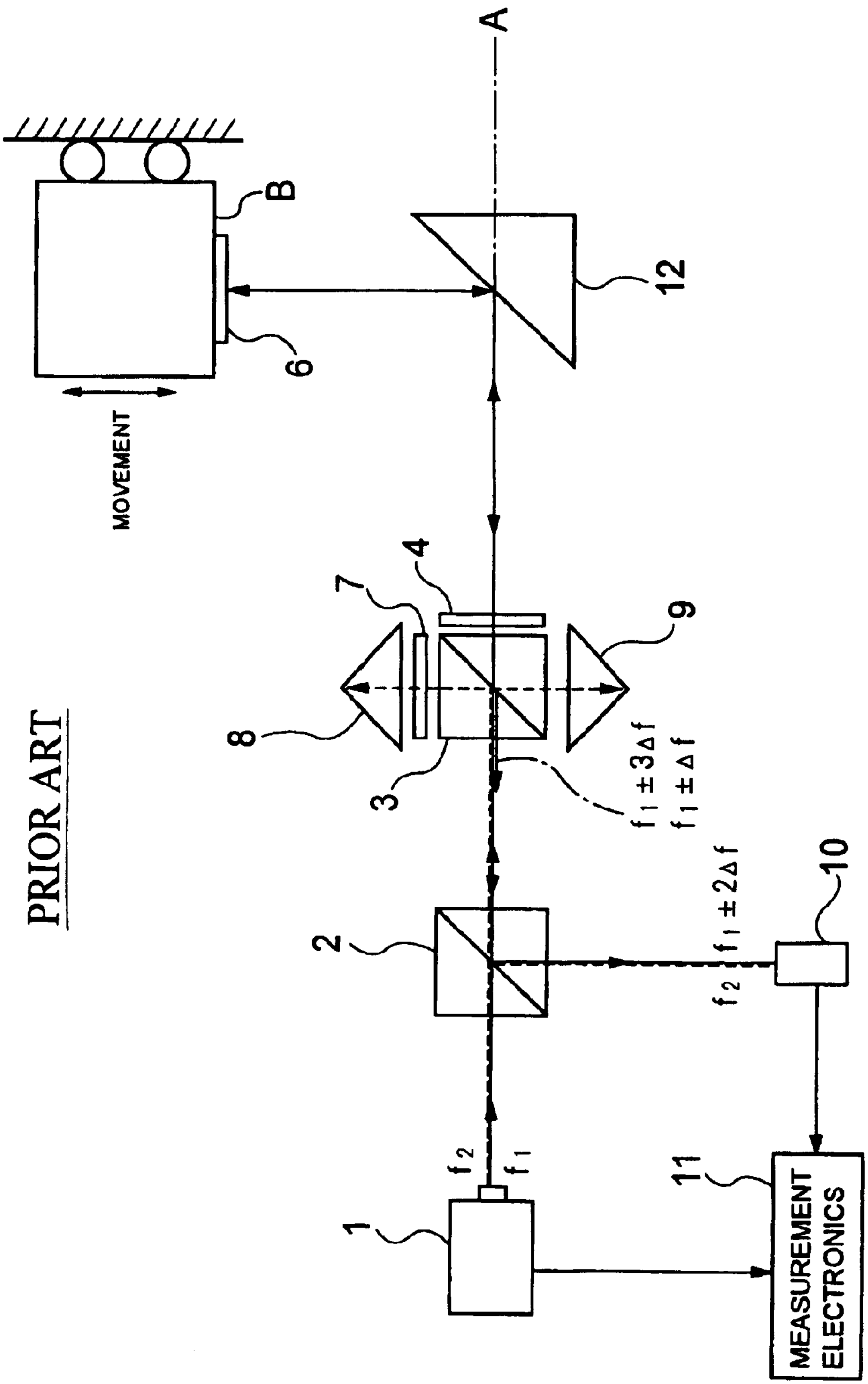
FIG. 3 is a diagram illustrating a conventional laser distance measuring system.
Figure 4:
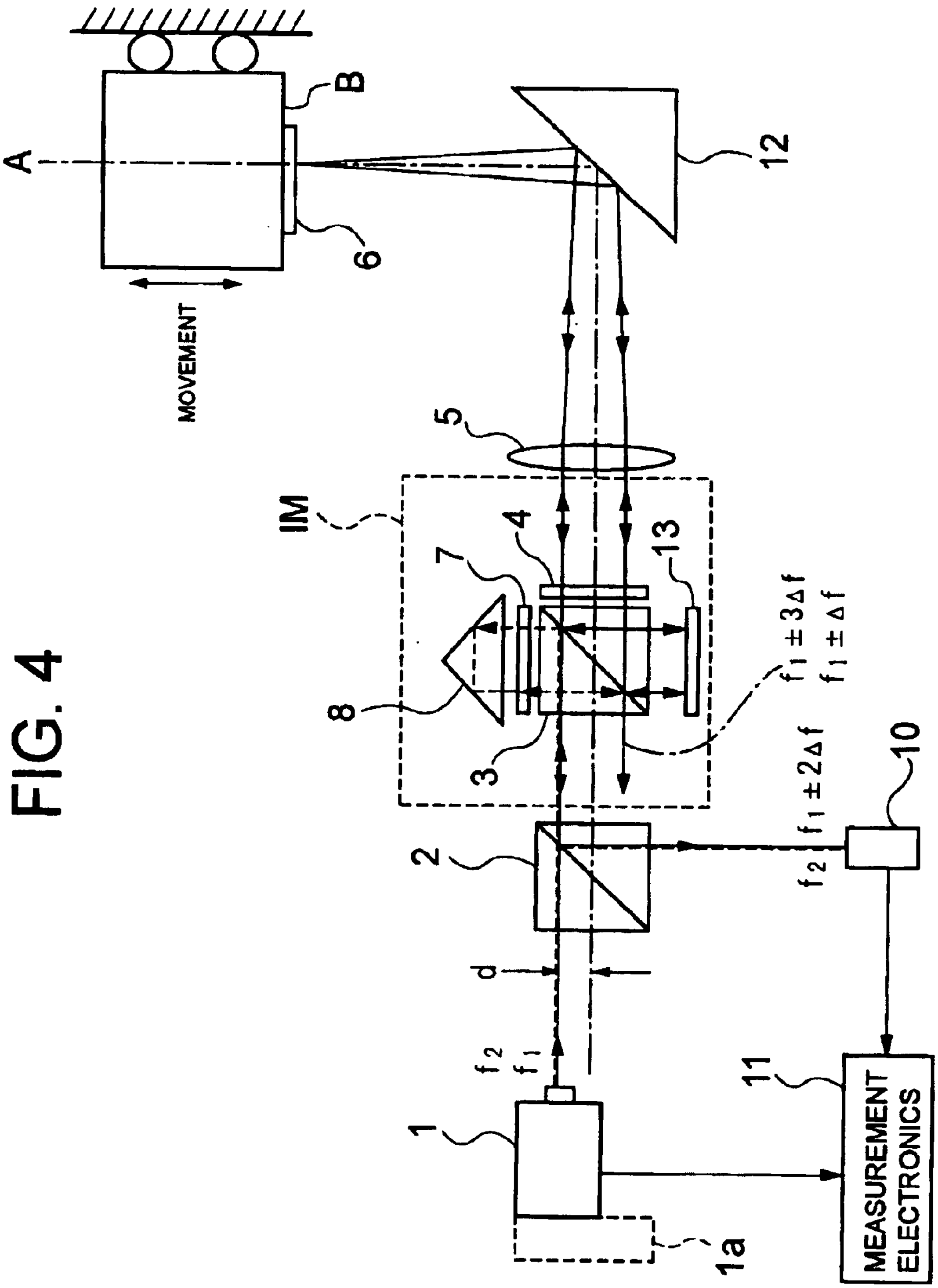
FIG. 4 is a diagram illustrating a laser distance measuring system according to an embodiment of the invention.

FIG. 4 shows the laser distance measuring system of this embodiment. The laser distance measuring system is provided with a laser light source, such as the Zeeman HeNe laser 1 mentioned above, that generates at least two interferable light beams having different frequencies and that share the same optical axis. The laser distance measuring system emits the light beams toward a reflecting surface 6, which is a flat reflector, that is included in an object B that moves along a measurement axis A and that is arranged perpendicularly to the measurement axis. The laser distance measuring system is provided with a two-path interferometer IM that is arranged on the measurement axis A and positioned between the laser light source 1 and the reflecting surface 6. The laser distance measuring system has a converging lens 5, which is arranged between the two-path interferometer IM and the reflecting surface 6 included in the object B, and which has an optical axis that coincides with the measurement axis A and a focal point on the measurement axis A. The converging lens 5 focuses the light onto the reflecting surface 6 to be measured, and achieves a cat's eye configuration in which the ingoing and outgoing optical axes are made parallel. The converging lens 5 and the reflecting surface 6 together make up a parallel reflection portion that returns incident light beams in an opposite direction but parallel to and at a certain spacing from the incident light.

In this embodiment, the laser light source 1 is supported so that the light beam is displaced from the measurement axis A to an optical axis parallel to its original optical axis and a portion of the light beam passes through the two-path interferometer IM and is guided to the convergent lens 5 and the reflecting surface 6. It is also possible to provide a means 1*a* for supporting the laser light source 1 so that the optical axis of the light beam is displaced from the measurement axis A and a portion of the light beam passes through the two-path interferometer IM and is guided to the parallel reflection portion.

The two-path interferometer IM has a polarizing beam splitter 3 that is arranged on the measurement axis A, and a fastened corner cube 8 and a flat reflector 13, which together form a pair, opposing one another with the polarizing beam splitter and the measurement axis sandwiched in between. The two-path interferometer IM is further provided with a quarter wavelength plate 4 provided on the output side of the polarizing beam splitter 3, and a quarter wavelength plate 7 arranged between the polarizing beam splitter 3 and the fastened corner cube 8. Of these reflection means, the flat reflector 13 is arranged such that it maintains the light path of a portion of the light beam that is returned from the reflecting surface 6 via the converging lens 5, that is, arranged so that the incident light beam and the reflected light beam proceed while coinciding with a direction normal to the flat reflector 13. The fastened corner cube 8 is a reference reflector that generates a reference light from another portion of the light beam.

Thus, the laser distance measuring system using a single-beam two-path interferometer according to this embodiment includes the flat reflector 13, as shown in FIG. 4, in place of a conventional corner cube, and moreover the measurement light is incident at a certain displacement from the center of the polarizing beam splitter 3. With this configuration, normal return light (reflected light passed twice) can be spatially separated from abnormal return light (reflected light passed once or three times). In other words, the measurement light f1 travels from the laser light source 1 to the non-polarizing beam splitter 2, the polarizing beam splitter 3, the quarter wavelength plate 4, the converging lens 5, the beam bender 12, the measured reflecting surface 6, the beam bender 12, the converging lens 5, and the quarter wavelength plate 4, in that order, and then returns to the polarizing beam splitter 3. The optical axis of this measurement light is shifted by twice the amount of displacement d with which the light is incident. If in this case the polarization is corrupted by the beam bender 12, then the extraordinarily polarized component that is passed through the beam splitter 3 returns to the non-polarizing beam splitter 2 with its optical axis still shifted and thus is not incident on the photodetector 10. On the other hand, the normally polarized component of the light travels from the flat reflector 13 to the polarizing beam splitter 3, the quarter wavelength plate 4, the converging lens 5, the beam splitter 12, the measured reflecting surface 6, the beam splitter 12, the converging lens 5, the quarter wavelength plate 4, and the polarizing beam splitter 3, in that order, returning to the non-polarizing beam splitter 2 with the same optical axis as the incident light and is incident on the photodetector 10. Similarly, of the reflected light that has been passed twice, the extraordinarily polarized component of the portion of the light that is reflected toward the flat reflector 13 by the polarizing beam splitter 3 travels from the flat reflector 13 to the polarizing beam splitter 3, the quarter wavelength plate 4, the converging lens 5, the beam splitter 12, the measured reflecting surface 6, the beam bender 12, the converging lens 5, the quarter wavelength plate 4, and the polarizing beam splitter 3, in that order, returning to the non-polarizing beam splitter 2 with its optical axis shifted by the amount of displacement 2*d* and is not incident on the photodetector 10.

Figure 5:
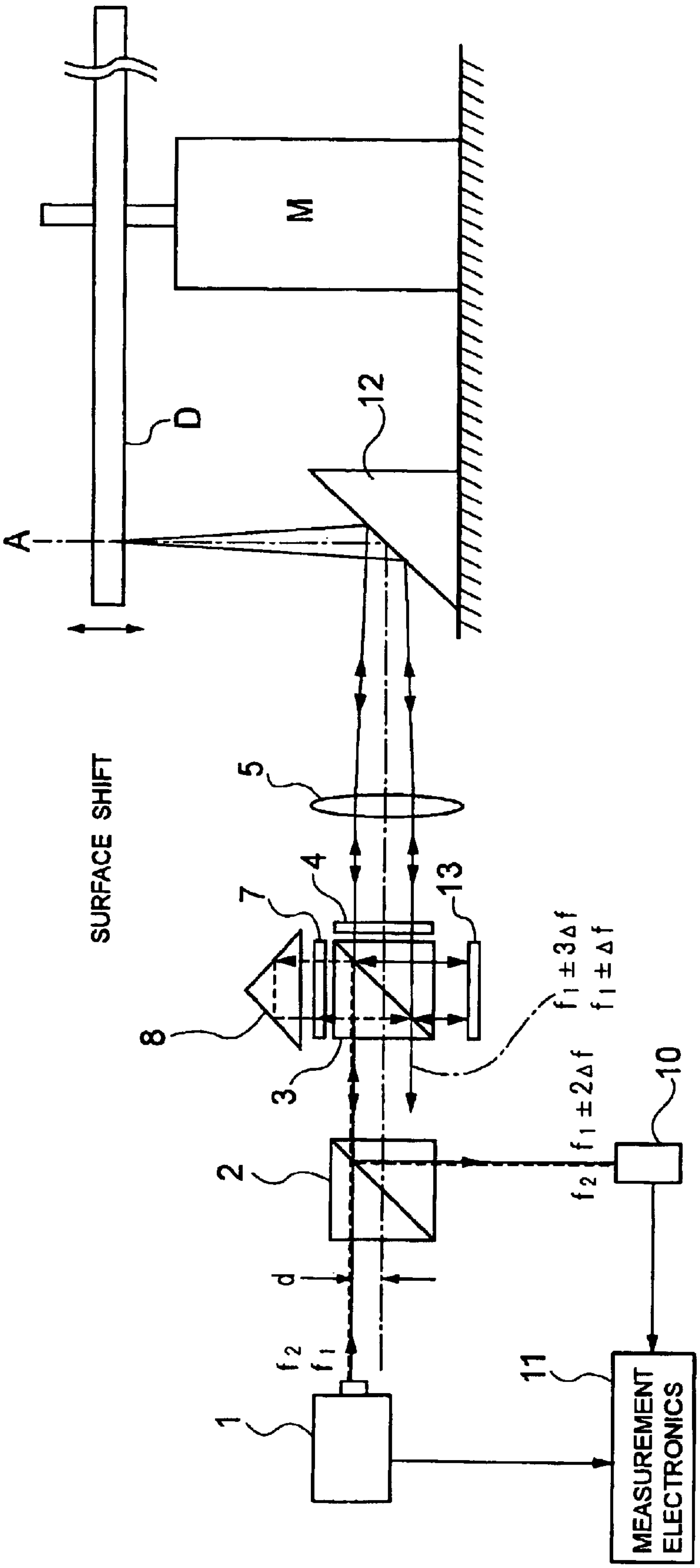
FIG. 5 is a diagram illustrating a laser distance measuring system according to another embodiment of the invention.

On the other hand, the reference light f2 travels from the laser light source 1 to the non-polarizing beam splitter 2, the polarizing beam splitter 3, the quarter wavelength plate 7, the corner cube 8, the quarter wavelength plate 7, the polarizing beam splitter 3, the flat reflector 13, the polarizing beam splitter 3, the quarter wavelength plate 7, the corner cube 8, the quarter wavelength plate 7, and the polarizing beam splitter 3, in that order, returning to the non-polarizing beam splitter 2 with the same optical axis as the incident light and is incident on the photodetector 10. Also here, the flat reflector 13 maintains the light path of the reference light beam. Accordingly, a configuration is achieved in which only the abnormal return light is separated and is not incident on the detector 10. As shown in FIG. 5, the laser distance measuring system of this embodiment can be used to measure the runout of the rotating disk. For example, laser distance measurement is possible in narrow spaces, such as between a disk, for example, a master disk D of optical disks, which is rotated by a spindle motor M, and the mount surface below the master disk D of optical disks. In this case, the beam bender 12 is arranged so that the primary surface of the disk is perpendicular to the measurement axis A.

Figure 6:
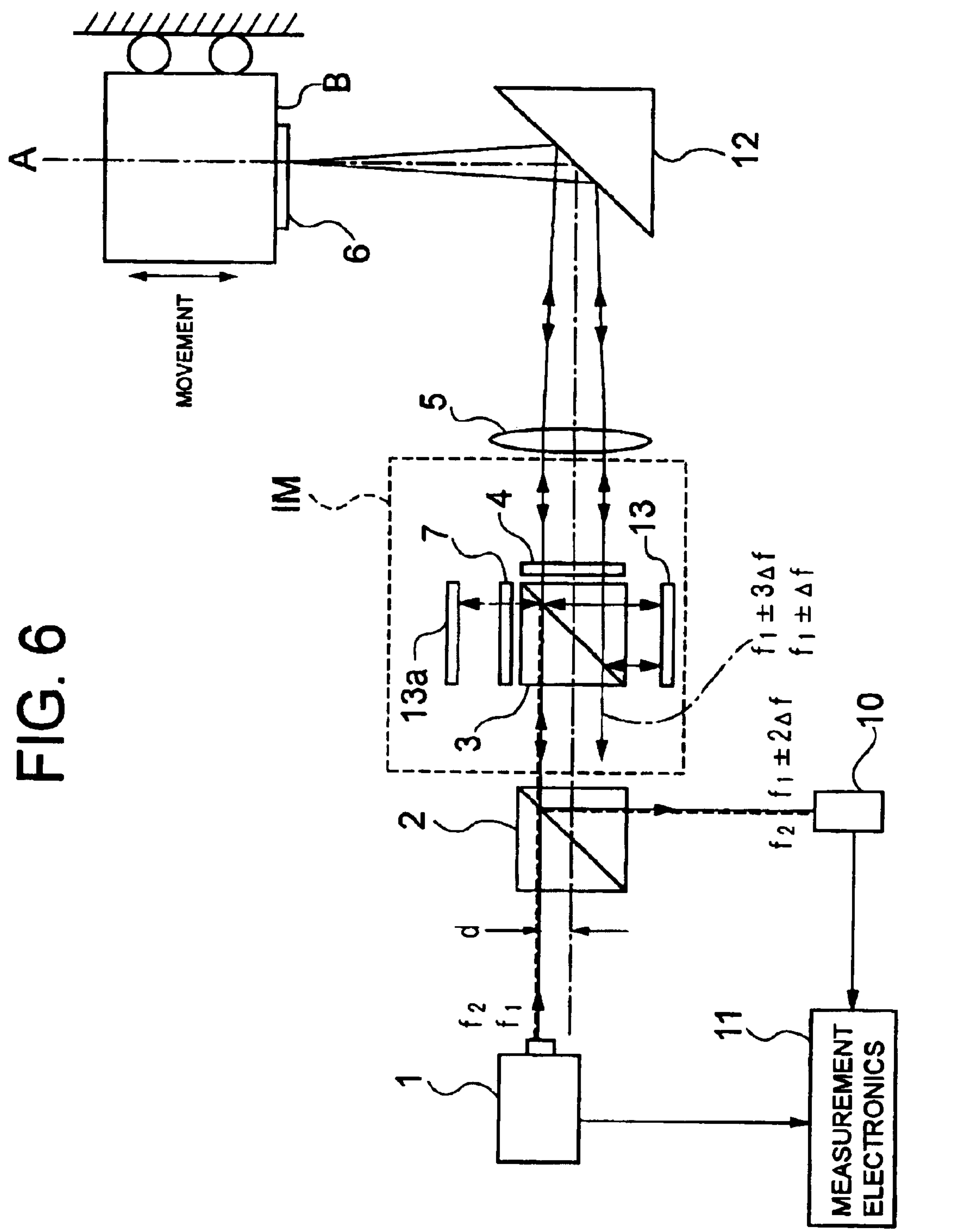
FIG. 6 is a diagram illustrating a laser distance measuring system according to another embodiment of the invention.

FIG. 6 shows a laser distance measuring system according to another embodiment. This laser distance measuring system is identical to the above laser distance measuring system and accomplishes the same operation except that the fastened corner cube 8 that is employed as the reference reflector in the above embodiment is replaced by a second flat reflector 13*a* that has been arranged and fixed so that the incident and reflected light beams proceed while coinciding with a direction normal to the flat reflector 13*a*. In this case, it is necessary that the alignment when attaching is more finely adjusted than in the case of a corner cube.

Figure 7:
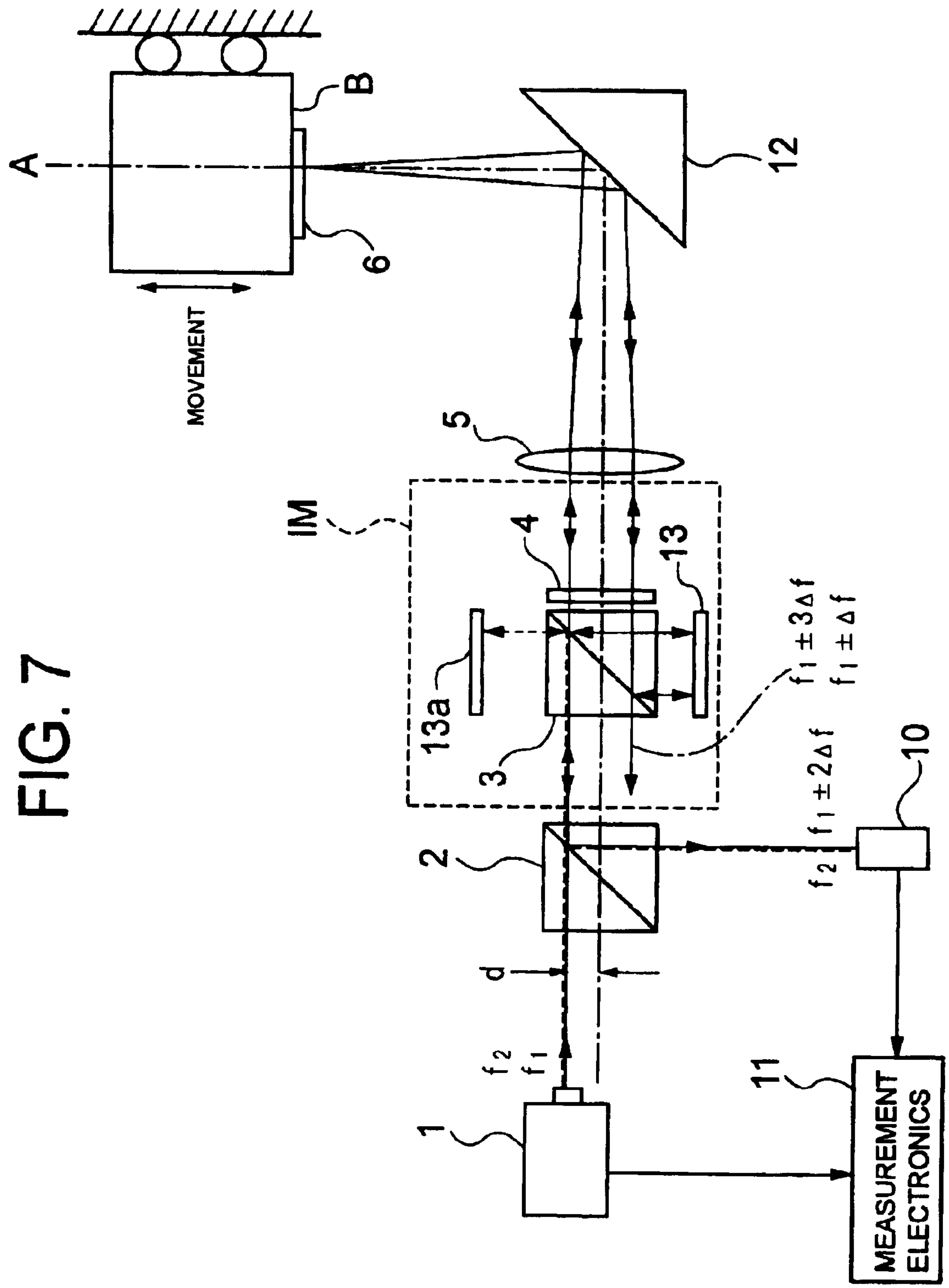
FIG. 7 is a diagram illustrating a laser distance measuring system according to another embodiment of the invention.

FIG. 7 shows a laser distance measuring system according to another embodiment. This laser distance measuring system is identical to the above-described embodiment and accomplishes the same operation except that the fastened corner cube 8 of the above laser distance measuring system is replaced by a second flat reflector 13*a* and the quarter wavelength plate 7 has been removed. In this case, there is the risk that a measurement error due to thermal expansion of the interferometer increases, so it is necessary to provide a cooler or a heat sink, for example.

Figure 8:
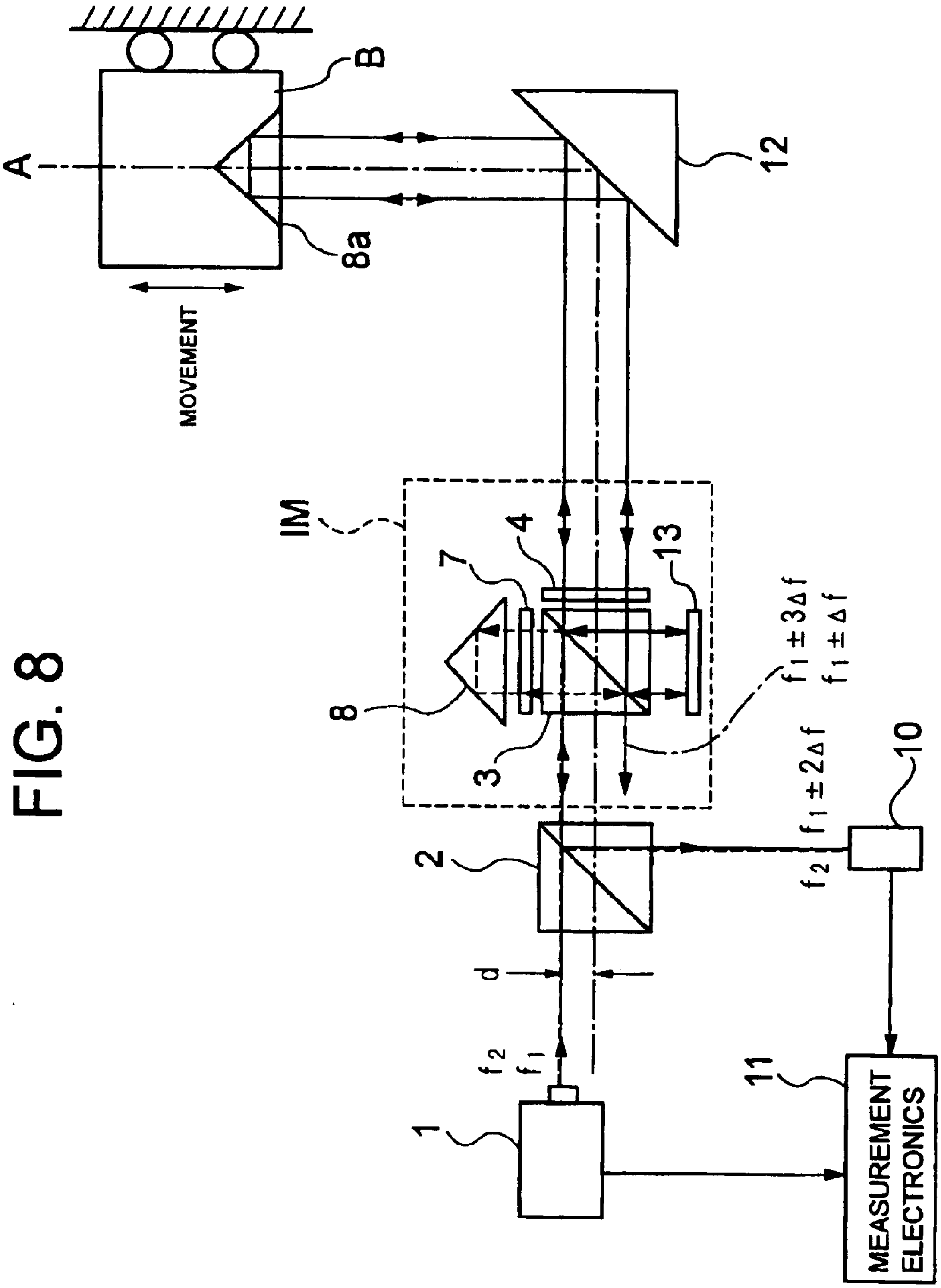
FIG. 8 is a diagram illustrating a laser distance measuring system according to another embodiment of the invention.

A laser distance measuring system according to another embodiment is shown in FIG. 8. This laser distance measuring system is identical to the above-described embodiment and accomplishes the same operation except that the converging lens 5 is not used and that the flat reflecting surface 6, which is included in the object B, is replaced by a corner cube 8*a* that is arranged on the object so that the measurement axis A passes through its apex. In this case, the volume of the corner cube 8*a* that is substituted may limit distance measurement in narrow areas where a single beam interferometer is used.

Figure 9:
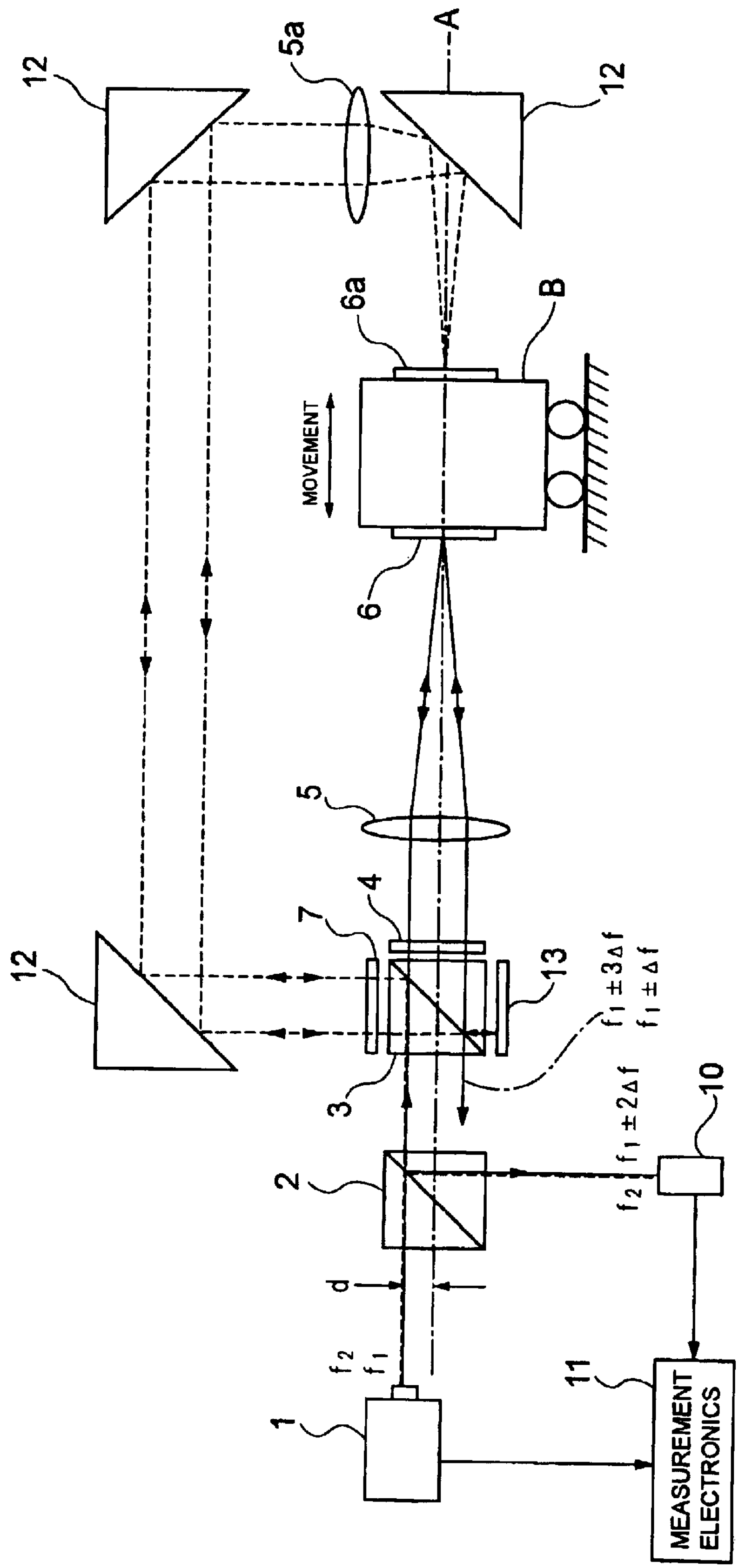
FIG. 9 is a diagram illustrating a laser distance measuring system according to another embodiment of the invention.

FIG. 9 shows a laser distance measuring system with a differential measurement configuration according to another embodiment. This differential laser distance measuring system is identical to the above embodiment except that the fastened corner cube 8 is replaced by three beam benders 12*a*, 12*b*, and 12*c*, a focusing lens 5*a*, and a second measurement reflecting surface 6*a*. The second measured reflecting surface 6*a* is provided on the measurement axis A on the side opposite the reflecting surface 6 of the object with its rear side parallel to and facing away from the reflecting surface 6. The focusing lens 5*a* and the second measured reflecting surface 6*a* (second parallel reflecting portion) together configure a cat's eye, in which incident light is returned in the opposite direction to which it is incident and is parallel to and a certain spacing from its original path of incidence. The three beam benders 12*a*, 12*b*, 12*c* together make up an opposing incidence optical system, which lets a portion of the light beam be incident on the second measured reflecting surface 6*a*, in opposition to the first reflective surface 6 on the measurement axis A.

In FIG. 9, the two optical components f1 and f2 that are output from the laser light source 1 pass through the non-polarizing beam splitter 2 and are separated by the polarizing beam-splitter 3 of the interferometer. The light f1 that has passed through the polarizing beam splitter 3 is reflected by the measured reflecting surface 6 and is returned. In this situation, it passes through the quarter wavelength plate 4 twice and its polarization plane is rotated 90°, so that this time it is bent toward the flat reflector 13 by the polarizing beam splitter 3 and returned along the same path, and is once again incident on the measured reflecting surface 6. The polarization plane of this light beam that is reflected and returned to the polarizing beam splitter 3 and is further rotated by 90°, so that this time it passes through the polarizing beam splitter 3 and is returned toward the laser light source 1. A portion of this returned light is separated by the non-polarizing beam splitter 2 and is on incident the photodetector 10.

The light beam f2 that is at first bent 90° by the polarizing beam splitter 3 travels back and fourth twice between the interferometer and the second measuring reflector 6*a*. That is, the light beam f2 is guided toward the second measured reflecting surface 6*a* on the opposite side by the three beam benders 12*a*, 12*b*, and 12*c*, and after it is reflected by the second measured reflecting surface 6*a*, it returns along the same light path, thereby passing through the quarter wavelength plate 7 twice. Thus, this returned light passes through the polarizing beam splitter 3 and travels to the flat reflector 13, and is returned along the same light path and once again reflected by the second measured reflecting surface 6*a* and is returned to the polarizing beam splitter 3. This returned light has had its polarization plane rotated by a further 90°, and thus this time it is bent by the polarizing beam splitter 3 and returns to the laser light source 1. A portion of the returned light is separated by the non-polarizing beam splitter 2 and is incident on the photodetector 10. At this time, if the measured object and the interferometer have moved relative to one another, then a Doppler component is added and f1 becomes f1±2Δf and f2 becomes f2±2Δf. Thus, the measurement signal that is heterodyne detected is f1−f2±4Δf and the resolution becomes four times that of a single beam interferometer with the basic configuration.

According to the invention, abnormal return light in a laser distance measuring system using a single beam two-path interferometer can be removed and components that corrupt the polarization, such as beam benders, can be arranged on the interference light path, so that a higher degree of freedom in the configuration of the optical system can be obtained. Thus, an interferometer can be adopted even in cases where there has been not enough space in which to arrange that interferometer at a spot from which change in an object is preferably measured.

Also, according to the invention, by arranging two reflectors so that their backs face one another on the measurement axis of the object to be measured and illuminating these reflectors using measurement light beams opposing one another with respect to the measurement axis, it is possible to achieve a differential laser distance measuring system that allows the differential measurement of displacements of opposite phases, thereby making it possible to achieve double the resolution. That is, if the single-beam two-path interferometer is provided with a differential measurement configuration, then a resolution that is four times as high as that of a conventional single-beam interferometer can be optically achieved. Additionally, the same interferometer can be adopted even if the reflecting surface itself corrupts the polarized light.

This application is based on Japanese Patent Application No. 2002-87907 which is herein incorporated by reference.

What is claimed is:

1. A laser distance measuring system comprising:

a laser light source that generates at least two interferable light beams with different frequencies on the same optical axis;

a parallel reflecting portion that includes a reflecting surface, which is included in an object that moves along a measurement axis and which is arranged on the measurement axis, the parallel reflecting portion returning an incident light beam in a direction opposite that at which it is incident, at a certain spacing from and parallel to the incident light beam; and an interferometer that is positioned between the laser light source and the parallel reflecting portion and that is arranged on the measurement axis;

wherein the optical axes of the light beams are displaced in a parallel manner from measurement axis and a portion of the light beams is passed through the interferometer and guided to the parallel reflecting portion, and wherein the interferometer comprises a flat reflector that maintains a light path of a portion of the light beams that is returned by the parallel reflecting portion.

2. The laser distance measuring system according to claim 1, wherein the interferometer comprises:

a polarizing beam splitter that is arranged on the measurement axis, a pair of first and second reflecting means that oppose one another with the polarizing beam splitter and the measurement axis sandwiched in between;

a quarter wavelength plate that is arranged on an output side of the polarizing beam splitter; and a quarter wavelength plate that is arranged between the polarizing beam splitter and the first reflecting means; and wherein the second reflecting means is the flat reflector and the first reflecting means is a fastened corner cube or a second flat reflector.

3. The laser distance measuring system according to claim 2, wherein the reflecting surface that is included in the object comprises a corner cub whose apex coincides with the measurement axis.

4. The laser distance measuring system according to claim 1, wherein the parallel reflecting portion comprises a converging lens, which is arranged between the interferometer and the reflecting surface that is included in the object, which has an optical axis that coincides with the measurement axis, and which has a focal point on the measurement axis.

5. The laser distance measuring system according to claim 4, wherein the reflecting surface that is included in the object comprises a corner cube whose apex coincides with the measurement axis.

6. The laser distance measuring system according to claim 2, wherein the parallel reflecting portion comprises a converging lens, which is arranged between the interferometer and the reflecting surface that is included in the object, which has an optical axis that coincides with the measurement axis, and which has a focal point on the measurement axis.

7. The laser distance measuring system according to claim 6, wherein the reflecting surface that is included in the object comprises a corner cube whose apex coincides with the measurement axis.

8. The laser distance measuring system according to claim 1, wherein the interferometer comprises:

a polarizing beam splitter that is arranged on the measurement axis, a pair of first and second reflecting means that oppose one another with the polarizing beam splitter and the measurement axis sandwiched in between;

a quarter wavelength plate that is arranged on an output side of the polarizing beam splitter; and a quarter wavelength plate that is arranged between the polarizing beam splitter and the first reflecting means;

wherein the second reflecting means is the flat reflector; and wherein the first reflecting means comprises:

a second parallel reflecting portion, which is provided on the measurement axis on a side of the object that is opposite to that of the parallel reflecting portion, which includes a second reflecting surface whose back faces the parallel reflecting portion, and which returns an incident light beam in a direction that is opposite to that at which it is incident and at a certain spacing from and parallel to the incident light beam; and an opposing incidence optical system that lets a portion of the light beams be incident on the second parallel reflecting portion in an opposing manner on the measurement axis.

9. The laser distance measuring system according to claim 8, wherein the reflecting surface that is included in the object comprises a corner cube whose apex coincides with the measurement axis.

10. The laser distance measuring system according to claim 8, wherein the second parallel reflecting portion comprises a second converging lens, which is arranged in the opposing incidence optical system, which has an optical axis that coincides the measurement axis, and which has a focal point on the measurement axis.

11. The laser distance measuring system according to claim 10, wherein the reflecting surface that is included in the object comprises a corner cube whose apex coincides with the measurement axis.

12. The laser distance measuring system according to claim 1, wherein the reflecting surface that is included in the object comprises a corner cube whose apex coincides with the measurement axis.

13. The laser distance measuring system according to claim 1, wherein the object is a disk having a principal face that is perpendicular to the measurement axis.

14. A laser distance measuring method for measuring an amount of movement of an object, which changes a length of one of the light paths, based on optical frequencies obtained by photoelectrically converting light beams that have traveled over different optical paths and been combined again, with a laser distance measuring system comprising a laser light source that generates at least two interferable light beams with different frequencies on the same optical axis, a parallel reflecting portion that includes a reflecting surface, which is included in an object that moves along a measurement axis and which is arranged on the measurement axis, the parallel reflecting portion returning an incident light beam in a direction opposite that at which it is incident, and at a certain spacing from and parallel to the incident light beam, and an interferometer that is positioned between the laser light source and the parallel reflecting portion and that is arranged on the measurement axis and has a flat reflector, the laser distance measuring method comprising:

a step of supporting the laser light source so that the optical axes of the light beams are displaced parallel to one another from the measurement axis and one of the light beams is passed through the interferometer and guided to the parallel reflecting portion; and a step of maintaining the optical path of the light beam that is returned by the parallel reflecting portion using the flat reflector.

15. The laser distance measuring method according to claim 14, further comprising:

a step of providing a second reflecting surface on the measurement axis and on the side of the object that is opposite the parallel reflecting portion so that its back is to the parallel reflector portion and making the other light beam on the measurement axis incident on the second reflecting surface so that it opposes the reflecting surface, and a step of returning to the interferometer the light that is reflected by the second reflecting surface in a direction opposite that at which it is incident and at a certain spacing from and parallel to the incident light.

16. The laser distance measuring method according to claim 15, wherein the parallel reflecting portion comprises a converging lens, which is arranged between the interferometer and the reflecting surface that is included in the object, which has an optical axis that coincides with the measurement axis, and which has a focal point on the measurement axis.

17. The laser distance measuring method according to claim 14, wherein the parallel reflecting portion comprises a converging lens, which is arranged between the interferometer and the reflecting surface that is included in the object, which has an optical axis that coincides with the measurement axis, and which has a focal point on the measurement axis.

* * * * *